July 20, 1943.    R. A. CRAWFORD    2,324,768
LIQUID GOLF BALL CORE
Filed June 7, 1940

Inventor
Richard A. Crawford
By Willis F. Avery
Atty

Patented July 20, 1943

2,324,768

UNITED STATES PATENT OFFICE 2,324,768

LIQUID GOLF BALL CORE

Richard A. Crawford, Akron, Ohio, assignor to The B. F. Goodrich Company, New York, N. Y., a corporation of New York Application June 7, 1940, Serial No. 339,329

10 Claims. (Cl. 154—18)

This invention relates to a method of making liquid cores for resilient balls and particularly for golf balls.

It has long been recognized that the best golf balls in respect to distance of drive as well as to general playability have cores comprising a viscous liquid, usually enclosed in a rubber covering. In a typical golf ball, such a core is wrapped with strands or threads of rubber under tension so that a compressive force is exerted on the core. The ball is built up by winding these strands or threads of rubber around the core and the whole is covered with a tough balata or balata-like outer cover. The superiority of golf balls with liquid cores over those with solid cores is due to the high resiliency of the liquid cores of such balls when they are subjected to impacts of very short duration, such as are imparted by the impact of a golf club on the golf ball. When the golf ball with the liquid core is struck with a club it is deformed by the blow. The liquid core, being very resilient, is likewise readily deformed. The windings of rubber thread around the core are thereby placed under increased tension and immediately exert a powerful reactive force to relieve the tension and pull the core back into its original spherical shape. This counter force of the windings is what gives the ball a long drive.

I have discovered a new method of making liquid cores for resilient balls, and particularly for golf balls, that comprises molding a spherical pellet from a moldable material capable of being chemically converted to a liquid, adding a chemical capable of converting the moldable material to a liquid, covering the pellet with vulcanizable rubber, and applying heat to bring about the conversion of the moldable material to a liquid. The heat may be the heat used in vulcanizing the rubber covering of the pellet. This method of making a liquid golf ball core is convenient to use as the moldable material is easy to handle and the core is covered with rubber before it is converted into liquid form.

Figure 1:
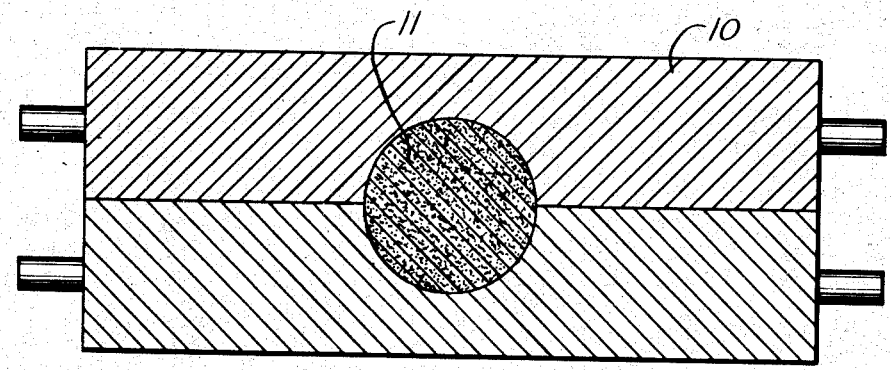
Figure 2:
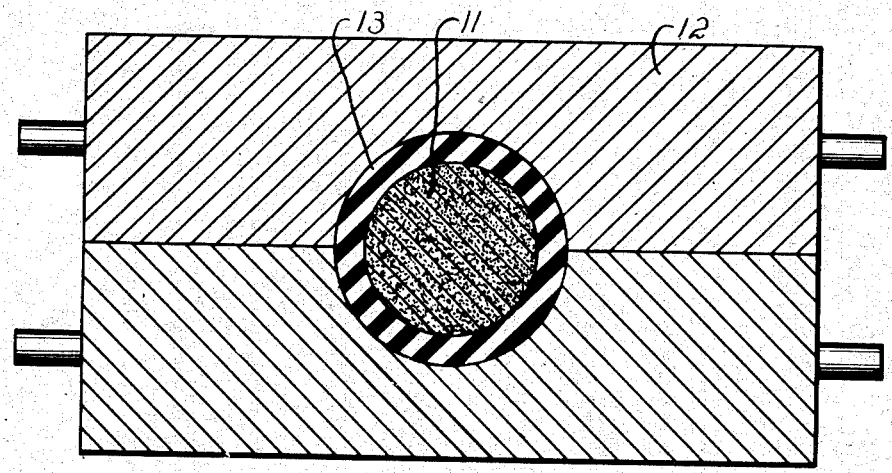

This invention can be described conveniently by means of the accompanying drawing, of which Fig. 1 is a cross-sectional elevation of a golf ball core pellet in a mold;

Fig. 2 is a cross-sectional elevation of a golf ball core in a mold, the core comprising the core pellet surrounded by a rubber core cover.

In practicing this invention a mold 10 is provided having a cavity in which is placed 0.75 gram of cane sugar 11. Three drops of 0.5 N sulfuric acid are dropped on the sugar pellet 11 and the pellet is placed inside a vulcanizable rubber core cover 13. The covered pellet is then placed in another mold 12 and the assembly is heated, as with steam, to simultaneously vulcanize the rubber core cover and chemically convert the sugar to a viscous liquid. This produces a golf ball core that has a liquid center surrounded by a rubber core cover.

Some of the moldable materials that may be used in this invention are the sugars, gelatin, thick glues, starches, gum arabic, glucoside gums, and the like. These materials are easily moldable into spherical pellets and are all easily hydrolyzed to liquids under the influence of acidic or alkaline catalysts. One of the best of these materials is ordinary cane sugar. The converting chemicals may be either acids or alkalis or may be acidic or alkaline inorganic salts. Examples of these converting chemicals may be any of the usual acids and alkalis such as sulfuric acid, hydrochloric acid, acetic acid, sodium hydroxide, as well as the common acidic or alkaline salts such as sodium carbonate, trisodium phosphate, and many others which are recognized by those skilled in the art. A preferred method of practicing this invention is to mold the moldable material into a spherical pellet, place the pellet in a hemispherical rubber covering material that has been hollowed out to receive the pellet, add the converting chemical to the moldable material, cover the pellet with another similar hemispherical rubber covering, and vulcanize the two rubber hemispheres together in a vulcanizing mold. This heat of vulcanization brings about the conversion of the moldable material to a liquid by hydrolysis under the action of the acidic or alkaline catalyst. The invention can be best understood from the following examples:

*Example 1.*—0.75 gram of cane sugar are pressed into a pellet as in an ordinary pill making machine. The pellet is placed in a half of a semi-vulcanized core cover and three drops of 0.5 N sulfuric acid are dropped on the sugar. The other half of the semi-vulcanized core cover is positioned over the core and the two halves vulcanized together by heating. This heat of vulcanization likewise brings about the reaction that liquefies the core. The rubber covered core is then wrapped with rubber thread and covered as in the usual operations involved in manufacturing a golf ball. The sugar-water-acid core is found to be permanently liquid even at low temperature.

*Example 2.*—1.0 gram of a 5% aqueous solution of gelatin by weight containing 4% trisodium phosphate by weight of the gelatin is molded into a spherical pellet in a cold mold. The pellet is placed in the halves of a semi-vulcanized rubber covering and the two halves vulcanized together. This heat of vulcanization liquefies the gelatin core.

*Example 3.*—1.0 gram of gum arabic is molded in the shape of a spherical pellet. 5 drops of a 1.0 N sodium hydroxide solution is added and the pellet is placed in a semi-vulcanized rubber covering and the rubber is vulcanized by a heat treatment, thereby liquefying the gum arabic core.

*Example 4.*—1.0 gram of glue and 0.04 gram of trisodium phosphate are molded into a spherical pellet. The pellet is placed in the halves of a semi-vulcanized rubber covering and the two halves vulcanized together. The heat of vulcanization liquefies the glue core.

The preferred moldable materials used in this invention are organic compounds that are easily hydrolyzed to a liquid by the catalytic action of acidic or alkaline compounds. They are all easily molded into pellets and they are hydrolyzed to liquids under a moderate degree of heat.

It is my desire to protect this invention broadly without being confined to any particular moldable material of the type disclosed or to any particular acidic or basic catalyst within the spirit and scope of the appended claims.

I claim:

1. The method of making a liquid core for a resilient ball which comprises forming the core from a moldable material capable of being chemically converted to a liquid and chemically converting the moldable material to a liquid by a subsequent chemical reaction, thereby changing the chemical constitution of the material.

2. The method of making a liquid core for a resilient ball which comprises molding a pellet comprising a moldable material capable of being chemically converted to a liquid, associating a converting chemical with the pellet material, covering the pellet with vulcanizable rubber, and simultaneously vulcanizing the rubber covering and liquefying the core by means of a heat treatment effective to bring about a chemical reaction between the moldable material and the converting chemical and thereby to effect a change in the chemical constitution of the moldable material.

3. The method of making a liquid core for a golf ball which comprises molding a pellet of a sugar, associating with the pellet an acidic converting substance, and converting the sugar to a liquid by means of a heat treatment in a subsequent processing operation.

4. The method of making a liquid core for a golf ball which comprises molding a pellet comprising a sugar, associating with the sugar an acidic converting substance, covering the pellet of sugar with vulcanizable rubber, and heating to simultaneously vulcanize the rubber and convert the sugar to a liquid.

5. The method of making a liquid core for a golf ball which comprises molding a pellet comprising gelatin, associating with the gelatin pellet a chemical converting compound adapted, by chemical reaction therewith, to convert the gelatin to a liquid, and converting the gelatin to a liquid by means of a heat treatment effective to bring about a chemical reaction between the gelatin and the chemical converting compound.

6. The method of making a liquid core for a golf ball which comprises molding a pellet comprising gelatin, associating with the gelatin pellet a minor proportion of an alkaline converting material adapted, by chemical reaction therewith, to convert the gelatin to a liquid, covering the pellet with vulcanizable rubber, and heating to simultaneously vulcanize the rubber and convert the gelatin to a liquid.

7. The method of making a liquid core for a golf ball which comprises molding a pellet comprising glue, associating with the glue pellet a chemical converting compound adapted, by chemical reaction therewith, to convert the glue to a liquid, and converting the glue pellet to a liquid in the subsequent processing operation.

8. The method of making a liquid core for a golf ball which comprises molding a pellet comprising glue, associating with the glue pellet a minor proportion of an alkaline converting substance adapted, by chemical reaction therewith, to convert the glue to a liquid, covering the glue pellet with vulcanizable rubber, and heating to simultaneously vulcanize the rubber and convert the glue to a liquid.

9. The method of making a liquid core for a resilient ball or the like which comprises molding a pellet from an organic material capable of being hydrolyzed to a liquid by a catalytic chemical action, associating a chemical hydrolyzing catalyst with the pellet material, and chemically converting the pellet material to a liquid by means of a heat treatment.

10. The method of making a liquid core for a golf ball which comprises molding a pellet from an organic material capable of being hydrolyzed to a liquid by a catalytic chemical action, associating a chemical hydrolyzing catalyst with the pellet material, covering the pellet with vulcanizable rubber, and heating to simultaneously vulcanize the rubber and convert the pellet material to a liquid.

RICHARD A. CRAWFORD.